US012278435B2

(12) United States Patent
Magill et al.

(10) Patent No.: US 12,278,435 B2
(45) Date of Patent: Apr. 15, 2025

(54) MINIATURE ANTENNA WITH OMNIDIRECTIONAL RADIATION FIELD

(71) Applicant: The Queen's University of Belfast, Belfast (GB)

(72) Inventors: Matthew Magill, Belfast (GB); Gareth Conway, Portadown (GB)

(73) Assignee: THE QUEEN'S UNIVERSITY OF BELFAST, Belfast (GB)

( * ) Notice: Subject to any disclaimer, the term of this patent is extended or adjusted under 35 U.S.C. 154(b) by 105 days.

(21) Appl. No.: 18/021,671

(22) PCT Filed: Aug. 16, 2021

(86) PCT No.: PCT/EP2021/072762
§ 371 (c)(1),
(2) Date: Feb. 16, 2023

(87) PCT Pub. No.: WO2022/038102
PCT Pub. Date: Feb. 24, 2022

(65) Prior Publication Data

US 2023/0318186 A1 Oct. 5, 2023

(30) Foreign Application Priority Data

Aug. 19, 2020 (GB) ..................................... 2012970

(51) Int. Cl.
*H01Q 9/04* (2006.01)

(52) U.S. Cl.
CPC ................................ *H01Q 9/0442* (2013.01)

(58) Field of Classification Search
CPC .... H01Q 9/0442; H01Q 9/045; H01Q 9/0464; H01Q 13/106
See application file for complete search history.

(56) References Cited

U.S. PATENT DOCUMENTS 5,646,634 A 7/1997 Bokhari et al.
5,966,096 A 10/1999 Brachat
(Continued)

FOREIGN PATENT DOCUMENTS

CN 110120580 A 8/2019
JP 6470132 B2 * 2/2019 ............... G06K 7/10
(Continued)

OTHER PUBLICATIONS

International Search Report and Written Opinion pertaining to PCT/EP2021/072762 issued Nov. 29, 2021.
(Continued)

*Primary Examiner* — Graham P Smith
*Assistant Examiner* — Leah Rosenberg
(74) *Attorney, Agent, or Firm* — GRUMBLES LAW PLLC; Brittany Haanan

(57) ABSTRACT

An antenna comprises a planar radiating structure, a ground plane and a feed structure. The radiation structure comprises a plurality of slots arranged symmetrically in concentric rings around an inner portion of the radiating structure. The slots are arranged to create a meandering current path on the radiating structure. The antenna produces an omnidirectional, monopole-like radiation field, and is relatively small with relatively high performance making it suitable for use in a wide variety of applications including those with challenging environments.

20 Claims, 4 Drawing Sheets

(56) References Cited

U.S. PATENT DOCUMENTS

| | | | |
|---|---|---|---|
| 8,912,970 B1 | 12/2014 | Manry, Jr. et al. | |
| 2008/0204326 A1* | 8/2008 | Zeinolabedin Rafi ........................ | H01Q 9/0428 343/700 MS |
| 2018/0342795 A1* | 11/2018 | Yoo ....................... | A61B 5/0031 |
| 2020/0127388 A1 | 4/2020 | Hsiao et al. | |

FOREIGN PATENT DOCUMENTS

| | | |
|---|---|---|
| TW | I699040 B | 7/2020 |
| WO | 2016208737 A1 | 12/2016 |

OTHER PUBLICATIONS

Search Report pertaining to corresponding application GB 2012970.6 issued Jan. 15, 2021.

* cited by examiner

MINIATURE ANTENNA WITH OMNIDIRECTIONAL RADIATION FIELD

FIELD OF THE INVENTION

This invention relates to antennas. The invention relates particularly to antennas with an omnidirectional radiation field.

BACKGROUND TO THE INVENTION

Designing antennas for use in difficult propagation environments, for example in a human body-mounted device or a vehicle-mounted device, is challenging since the environment may have adverse effects on the antenna, including a reduction in radiation efficiency, input impedance variation, radiation pattern fragmentation and polarization distortion. Simultaneously, there is a demand for low profile, minimum volume antenna structures for use in such environments. Currently available antennas tend to be either too large or have insufficient performance to meet all of the demands of modern day applications. In particular, known antennas that perform well in difficult propagating environments are not of a physical form that suit commercial needs. Accordingly, PCB integrated or chip antennas currently used in industry tend to exhibit poor performance. For applications involving challenging environments, these antennas are failing, meaning a communication link cannot be achieved.

It would be desirable to mitigate the problems outlined above.

SUMMARY OF THE INVENTION

The invention provides an antenna comprising: a planar radiating structure; a ground plane; and a feed structure coupled to the radiating structure, wherein the radiation structure comprises a plurality of slots located around an inner portion of the radiating structure, the slots being arranged symmetrically about at least one axis that lies in the plane of the radiating structure.

Preferably, the slots are arranged to form at least one ring around said inner portion. The slots are preferably arranged to form a plurality of concentric rings. The, or each, ring is preferably circular.

Advantageously, the slots are arranged such that the, or each, ring is symmetrical about said at least one axis. Preferably, the slots are arranged such that the, or each, ring is symmetrical about both of said perpendicular axes.

In preferred embodiments, the, or each, ring comprises one or more slots, preferably two slots. Each slot is preferably shaped to form a respective half of the respective ring. The, or each, ring is preferably circular and each slot is arc-shaped, e.g. substantially semi-circular.

In preferred embodiments, the, or each, ring comprises two or more slots, arranged end-to-end and being spaced apart to leave an intra-ring gap between adjacent ends of adjacent slots. The, or each, slot of any one of said rings are preferably arranged with respect to the, or each, slot of the, or each, adjacent ring such that the respective intra-ring gaps of adjacent rings are not aligned along any axis in the plane of the radiating structure. The preferred arrangement is such that the intra-ring gaps of any two adjacent rings are evenly spaced apart around the centre of the rings.

In a preferred embodiment, the slots of any one ring are angularly displaced about the ring centre by 90° with respect to the slots of the, or each, adjacent ring such that the respective intra-ring gaps are angularly spaced apart by 90° about the ring centre.

Optionally, the slots are arranged to form four concentric rings. Alternatively, the slots are arranged to form three concentric rings.

Advantageously, said slots are arranged to create a meandering current path on said radiating structure from said inner portion of said radiation structure to an outer portion of said radiating structure.

Advantageously, the slots are arranged symmetrically about two perpendicular axes that lie in the plane of the radiating structure.

In preferred embodiments, the feed structure comprises a feed line and a feed connector connected between the feed line and the inner portion of the radiating structure. The feed connector typically connects with said radiating structure at a feed point, wherein, preferably, at least one axis of symmetry extends through said feed point.

Typically, said radiating structure is rectangular, and wherein said at least one axis is parallel with a respective edge of the radiating structure.

Typically, said at least one axis extends through a centre of said inner portion.

In preferred embodiments, at least one shorting connector connected between the radiating structure and the ground plane, preferably between said inner portion and said ground plane. Said at least one shorting connector is preferably arranged symmetrically with respect to said at least one axis.

In preferred embodiments, the antenna comprises a planar radiating structure, a ground plane and a feed structure, the radiation structure comprising a plurality of slots arranged symmetrically in concentric rings around an inner portion of the radiating structure. The slots are advantageously arranged to create a meandering current path on the radiating structure. The preferred antenna produces an omnidirectional, monopole-like radiation field, and is relatively small with relatively high performance making it suitable for use in a wide variety of applications including those with challenging environments.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
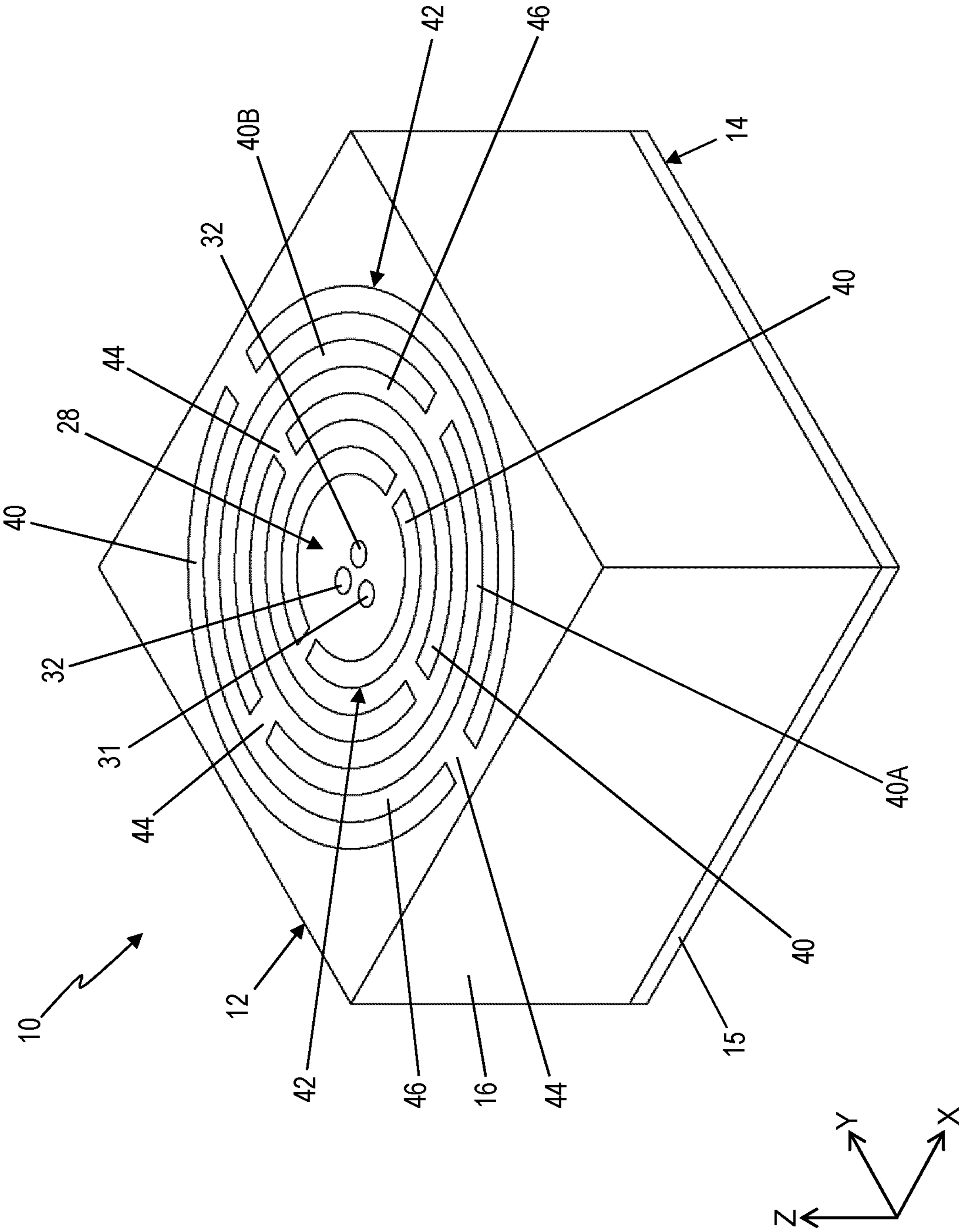
FIG. 1 is an isometric view of an antenna embodying the invention.
Figure 2:
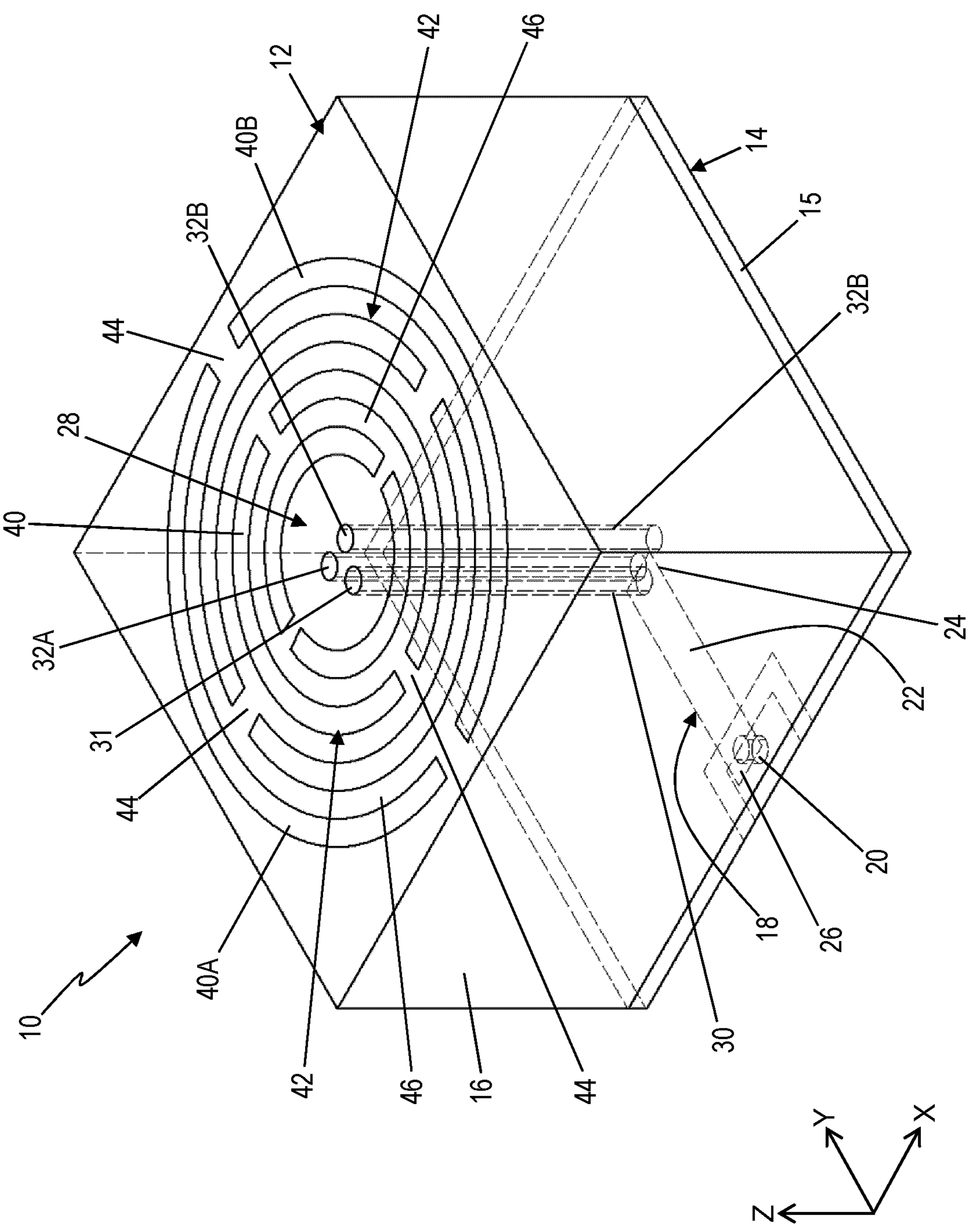
FIG. 2 is a transparent isometric view of the antenna of FIG. 1.
Figure 3:
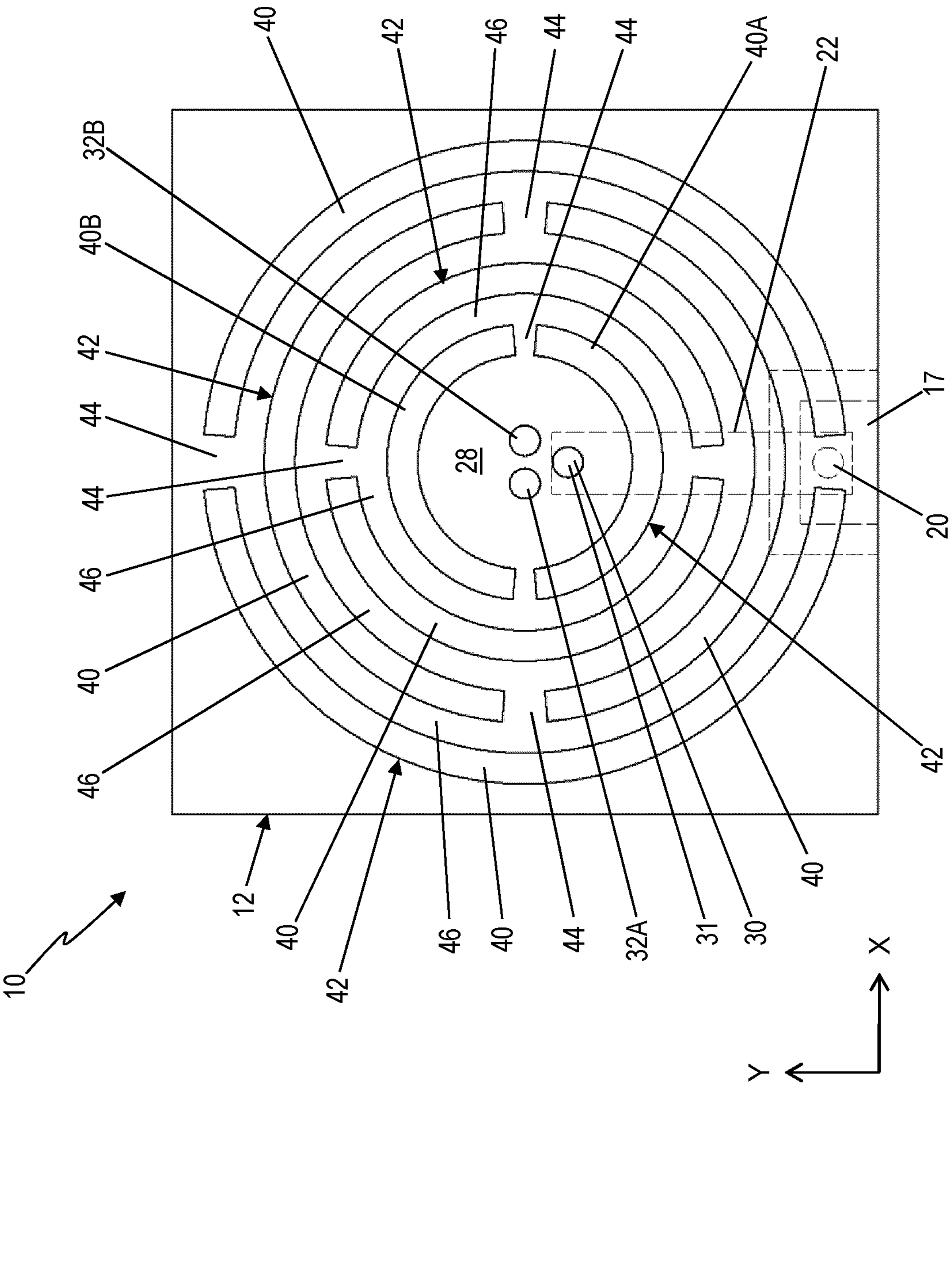
FIG. 3 is a plan view of the antenna of FIG. 1.
Figure 4:
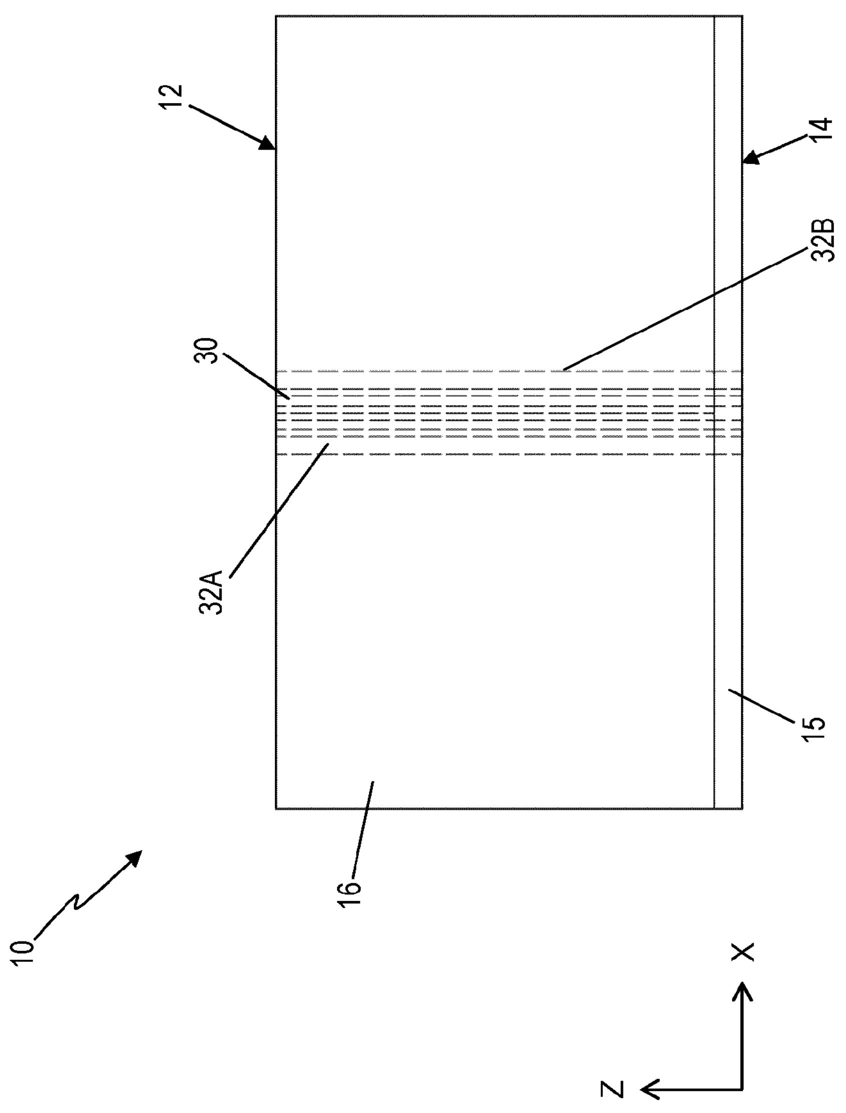
FIG. 4 is an end view of the antenna of FIG. 1.

Referring now to the drawings there is shown, generally indicated as 10, an antenna embodying the invention. The antenna 10 comprises a radiating structure 12 and a ground plane 14. The radiating structure 12 and ground plane 14 are spaced apart from each other in a first direction, which may be referred to as the Z-axis direction, and are preferably parallel with each other. In preferred embodiments the radiating structure 12 and ground plane 14 are aligned, or substantially aligned, with each other in the Z-axis direction, but in any event preferably at least partially overlap with each other in the Z-axis direction. In preferred embodiments, the antenna 10 is cuboid in shape, although may take other shapes in alternative embodiments.

In use, the antenna 10 is typically mounted on a substrate (not shown), for example a printed circuit board (PCB) or integrated circuit (IC) substrate, such that the radiating structure 12 faces away from the substrate, while the ground plane faces towards the substrate. Accordingly, the radiating structure 12 may be said to be located at the top of the antenna 10, and the ground plane 14 located at the bottom, and as such the Z-axis may be referred to as the top-to-bottom direction.

The radiating structure 12 may be formed from any electrically conductive material suitable for antenna radiating structures, typically metal, e.g. copper.

In preferred embodiments, the radiating structure 12 comprises a planar, or patch, radiating element. The patch 12 may be rectangular or square in shape, or may take other shapes, e.g. circular or elliptical. The patch 12 may have straight edges, or may have non-straight edges, for example meandered or fractal edges. In any event, the radiating structure 12 is preferably planar in form and preferably lies in an X-Y plane, where X and Y represent an X-axis and Y-axis respectively, and wherein the X, Y and Z axes are mutually orthogonal.

The radiating structure 12 is typically provided on an electrically insulating, or non-conductive, support structure 16, which may be referred to as a substrate, and which may comprise a block of electrically insulating material, preferably dielectric material. In alternative embodiments, the support structure 16 may comprise a stack of layers of electrically insulating, or dielectric, material. Any conventional electrically insulating, or dielectric material, may be used to form the support structure 16, for example laminate material for use in circuit boards or microwave or RF applications. The radiating structure 12 may be provided as a layer or patch of conductive material on the top surface of the substrate 16.

The ground plane 14 may be formed from any electrically conductive material suitable for forming antenna ground planes, typically metal, e.g. copper. The ground plane 14 may be connected to electrical ground in any convenient manner. The ground plane 14 may be rectangular or square in shape, or may take other shapes, usually to match the shape of the radiating structure 12. The ground plane 14 preferably lies in an X-Y plane.

The ground plane 14 is optionally provided on an electrically insulating support structure 15, which in the illustrated embodiment is provided at the bottom of the support structure 16. The support structure 15 typically comprises an electrically insulating substrate, e.g. formed from a dielectric material, and may be provided on or integrated with the support structure 16 in any conventional manner. Alternatively, the ground plane 14 may be provided on the support structure 16. The ground plane 14 may be provided as a conductive layer on a surface, preferably a bottom surface, of the support structure 15 or other surface, e.g. the bottom of the structure 16. The support structure, or substrate, 15 may be part of the support structure 16, e.g. they may be provided by a single block of electrically insulating, or dielectric, material, or it may be formed separately from the structure 16 and fixed thereto by any conventional means. The support structures 15, 16 may be formed from the same material (especially when they are formed as a single block) or may be formed from different material. Any conventional electrically insulating, or non-conductive material, may be used to form the substrates 15, 16, especially dielectric material. For example dielectric composite material, or laminate material, for use in circuit boards or microwave or RF applications may be used. By way of example, either one or both of the substrates 15, 16, as applicable, may be formed from a ceramic-filled hydrocarbon thermoset material (which may be glass-reinforced), or any conventional epoxy/glass composite material, plastics/glass composite material, or paper/epoxy composite material.

The antenna 10 comprises a feed structure 18 that is typically located between the radiating structure 12 and the ground plane 14. The feed structure 18 is coupled to an external feed connector 20, which may be part of the antenna 10 or may be an external structure. In use, the antenna 10 is connected to external circuitry (not shown), typically comprising an RF transmitter, RF receiver or RF transceiver, via the connector 20. In a transmitting mode of the antenna 10, the feed structure 18 receives excitation signals from the external circuitry via the connector 20, and feeds the excitation signals to the radiating structure 12 for transmission thereby. In a receiving mode of the antenna 10, the feed structure 18 feeds received signals from the radiating structure 12 to the external circuitry via connector 20. The connector 20 may take any suitable conventional form, for example comprise an SMA connector or other device suitable for sending signals to and receiving signals from the antenna 10.

In preferred embodiments, the feed structure 18 comprises a feed line 22, typically in the form of a microstrip feed line. The feed line 22 may be formed from any electrically conductive material, typically metal, e.g. copper. The feed line 22 is located between, and is preferably parallel with, the radiating structure 12 and ground plane 14. The feed line 22 is spaced apart from the radiating structure 12 and the ground plane 14 in the Z-axis direction. The feed line 22 has a first, or free, end 24 located between the radiating structure 12 and the ground plane 14, and a second end 26 (which may be referred to as the feed end) coupled to the connector 20 (at least in use). The end 24 of the feed line 22 is aligned with an inner portion 28 of the radiating structure 12, the inner portion 28 typically being located centrally of the structure 12. The second end 26 is typically located at, or adjacent, a peripheral portion, e.g. side or edge, of the antenna 10. In preferred embodiments, the feed line 22. The preferred arrangement is such that the feed line 22 extends in the X or Y direction.

Typically, the feed line 22 is provided on a substrate of electrically insulating material, preferably a dielectric material. Typically, the feed line 22 is provided as a conductive, e.g. metallic, strip on a surface of the substrate. Conveniently, the feed line 22 is provided on the same substrate 15 as the ground plane 14, on the opposite surface to the ground plane 14. In the illustrated embodiment, the feed line 22 is formed in the top surface of substrate 15 and the ground plane 14 is on the bottom surface. In the illustrated embodiment, the feed connector 20 passes through the substrate 15. The ground plane 14 is shaped to define a region 17 of electrically insulating material around to the connector 20.

In preferred embodiments, the feed structure 18 also comprises a second feed connector 30 which connects the feed line 22 to the radiating structure 12 in order to convey excitation signals between the feed line 22 and the radiating structure 12. The second feed connector 30, which may conveniently take the form of a conductive post or pin, may be formed from any suitable conductive material, e.g. copper or other metallic material. The feed connector 30 extends from the free end 24 of the feed line 22 to a feed point 31 located in the inner portion 28 of the radiating structure 12. The feed connector 30 is preferably perpendicularly disposed with respect to the radiating structure 12.

In alternative embodiments (not illustrated) the feed structure 18 may take other forms, not necessarily comprising the feed line 22 and/or the feed connector 30. More generally, the feed structure 18 may be coupled with, or connected to, the radiating structure 12 by any conventional means. For example, the feed structure 18 may be a proximity-coupled feed structure, or an aperture-coupled feed structure, or other arrangement comprising a feed line that is indirectly coupled to the radiating structure 12 (e.g. electromagnetically coupled but not necessarily mechanically coupled).

In preferred embodiments, the antenna 10 includes at least one, and typically a plurality of, electrically conductive shorting connectors 32 connecting the radiating structure 12, in particular the inner portion 28 of the radiating structure 12, to the ground plane 14. The connectors 32 create an electrical connection between the radiating structure 12 and ground plane 14 to short the radiating structure 12 to the ground plane 14. The shorting connectors 32 typically take the form of a pin or a post. The shorting connectors 32 are preferably perpendicularly disposed with respect to the radiating structure 12.

The shorting connectors 32 are preferably arranged symmetrically with respect to at least one axis in the X-Y. In particular, the shorting connectors 32 are arranged symmetrically about at least one X-Y axis through the feed point 31. In the illustrated embodiment, first and second shorting connectors 32A, 32B are arranged symmetrically about an axis through the feed point 31 in the Y direction only. The shorting connectors 32 are preferably located adjacent the feed point 31. Placing the connectors 32 close to the centre of region 28 improves impedance match performance and positional symmetry across one axis and will reduce radiation pattern impurity.

The shorting connectors 32 are preferably arranged symmetrically with respect to the feed line 22, typically about the longitudinal axis of the feed line 22. In preferred embodiments, only two shorting connectors 32A, 32B are provided, although in other embodiments a single shorting connector 32 may be provided, or more than two shorting connectors 32 may be provided. The shorting conductors 32 may have any cross-section shape, e.g. circular or rectangular, and their size (width and/or length) may be adjusted to suit the application and/or the optimization of the antenna 10. The, or each connector 32 does not have to be in the form of a post (or pin), and may for example take any other convenient form, e.g. an elongate strip or wall of conductive material, which may run parallel with the ground plane 14.

In use, the shorting connectors 32A, 32B cause nulls in the radiation field, or electric field (E-field), of the antenna 10 between the radiating structure 12 and the ground plane 14. The nulls provided by the shorting connectors 32 facilitate production of the desired omnidirectional radiation pattern, and also facilitate miniaturization of the antenna 10. In alternative embodiments (not illustrated), especially where the requirement for miniaturisation is lower, the shorting connectors 32 may be omitted.

In preferred embodiments, the radiation field of the antenna 10, at least in one resonant mode, typically at least one higher order resonant mode of operation, has a monopole-like, or monopolar, radiation pattern or shape. In particular, the radiation field is omnidirectional in the azimuth plane.

A plurality of slots 40 are formed in the radiating structure 12. The slots 40 are arranged symmetrically with respect to at least one axis in the X-Y plane, i.e. the plane in which the radiating structure 12 lies, and preferably with respect to two perpendicular axes in the X-Y plane. In preferred embodiments, the axis, or one of the axes, about which the slots 40 are symmetrical is parallel with the longitudinal axis of the feed line 22. In preferred embodiments in which the radiating structure 12 is rectangular, or square, in shape, the axis, or each of the axes, about which the slots 40 are symmetrical is parallel with a respective edge of the radiating structure 12. In preferred embodiments, the shorting connectors 32 are symmetrically arranged with respect to the same axis/axes as the slots 40. The, or each, axis of symmetry passes through the inner portion 28, preferably through the centre of the inner portion 28.

The slots 40 are arranged around the inner portion 28 of the radiating structure 12 such that the inner portion 28 is located at the centre of the slot arrangement (and preferably also at the centre of the radiating structure 12). In the illustrated embodiment, the feed point 31 is located centrally on the X axis but is offset from the centre of the Y axis, and so is not located exactly at the centre of the inner portion 28. In alternative embodiments, the feed point 31 may be located elsewhere in the inner portion, preferably centrally located on at least one of the X and Y axes, and preferably close to the centre. In the illustrated embodiment, the shorting pins 32 are located centrally on the Y axis. In alternative embodiments, the shorting pins 32 may be located elsewhere in the inner portion, preferably close to the centre.

The slots 40 are arranged to form at least one but preferably a plurality of rings 42 around the inner portion 28. Preferably, each ring 42 comprises two or more slots 40 arranged in a ring-like manner. Within each ring 42, the respective slots 40 are arranged end-to-end with an intra-ring gap 44 between adjacent ends of adjacent slots 40. The intra-ring gaps 44 comprise conductive material since they are part of the radiating structure 12. Alternatively, the or each ring 42 may be formed by a single C-shaped slot with an intra-ring gap between its ends. The size of the intra-ring gaps 44, in particular the slot-to-slot length, may vary depending on the application, for example in order to tune the antenna 10, e.g. with respect to resonant frequency(ies) and/or bandwidth. Within any given ring 42, the size of each intra-ring gap 44 is preferably the same since this facilitates provision of a symmetrical ring arrangement.

In preferred embodiments the rings 42 are circular, but they may alternatively take other shapes, e.g. square, rectangular or other regular or symmetrical curved or polygonal shape. In preferred embodiments, each slot 40 is arc-shaped but other shapes may be used, e.g. C-shaped, U-shaped, curved or polygonal depending on the shape of the ring.

In preferred embodiments, there is a plurality of rings 42 of slots 40, the rings 42 being arranged concentrically around the inner portion 28. Adjacent rings 42 are spaced apart by an annular inter-ring gap 46. The inter-ring gaps 46 comprise conductive material since they are part of the radiating structure 12. The size of the inter-ring gaps 46, in particular the slot-to-slot width, may vary depending on the application, for example in order to tune the antenna 10, e.g. with respect to resonant frequency(ies) and/or bandwidth. For any given inter-ring gap 46, its width is preferably constant since this facilitates provision of a symmetrical ring arrangement.

The slots 40 may be formed in any conventional manner, e.g. by cutting, masking or etching. In any event, each slot 40 defines a non-conductive region of the radiating structure 12, and the edges 48 of the slots 40 are interfaces between the non-conductive slot area and the surrounding conductive material of the radiating structure 12, including the intra-ring gaps 44 and the inter-ring gaps 46.

In preferred embodiments, the slots 40 are arranged such that the rings 42 are symmetrical about the, or each, axis of symmetry in the X-Y plane. Each ring 42 preferably has the same number of slots 40. Preferably, the slots 40 all have the same width.

In preferred embodiments, each ring 42 comprises (only) two slots 40A, 40B. Each slot 40A, 40B is preferably the same size (preferably in length and width). Each slot 40A, 40B is shaped to form a respective half of the respective ring 42. For example, in preferred embodiments in which the rings 42 are circular, each slot 40A, 40B is arc-shaped, preferably substantially semi-circular. In alternative embodiments, there may be more than two slots in each ring 42. It is preferred however that there is an even number of slots 40 in each ring 42 since this facilitates creating symmetry about two perpendicular axes, which helps create the desired radiation field shape. It is found that resonant frequency reduction is adversely impacted by using any more than two slots per ring.

It is preferred that the slot(s) 40 of any one ring 42 are arranged with respect to the slot(s) 40 of the, or each, adjacent ring 42 such that the respective gap(s) 44 of adjacent rings 42 are not aligned along any axis in the X-Y plane. Advantageously, this non-aligned arrangement of slots 40, creates a maze-like or meandering current path from the feed point 31 to the outer edges of the radiating structure 12. As a result, the current path is relatively long (in comparison with cases where the gaps 44 are aligned), and this improves the minimisation achieved.

Preferably, the arrangement is such that the intra-ring gaps 44 of any two adjacent rings 42 are, collectively, evenly spaced apart around the centre of the rings 42. For example, in the preferred embodiment (as illustrated) in which each ring 42 has two slots 40A, 40B, the slots 40A, 40B of any one ring 42 are angularly displaced about the ring centre by 90° with respect to the slots 40A, 40B of the, or each, adjacent ring 42 such that the respective four gaps 44 (two of each ring) are angularly spaced apart by 90° about the ring centre.

In a preferred embodiment (as illustrated), there are (only) four rings 42. In another preferred embodiment (not illustrated), there are (only) three rings. In other embodiments there may be more than four or fewer than three rings. 2. With each additional ring of slots, the resonant frequency of the antenna is reduced, which facilitates the desired miniaturisation. However, with each additional ring, there are diminishing returns with regard to the reduction of resonant frequency vs increased area, and the complexity required to add the additional rings.

In preferred embodiments, the antenna 10 generates a higher order resonant mode that is achieved by driving the feed structure 18 with an alternating excitation signal within the resonant frequency impedance bandwidth of the antenna 10. By way of example, the antenna 10 may be configured to operate in the 868 MHz, 2.4 GHz and 5.8 GHz Industrial and Scientific Medical (ISM) bands. The shorting posts 32A, 32B force 'nulls' in the E-field between the radiating element 12 and ground plane 14. Accordingly, a higher order mode is generated which causes the antenna 10 to generate a monopole-like radiation pattern. The symmetrical maze-like pattern of slots 40 in the radiating structure 12 causes a corresponding pattern in surface current on the radiating structure 12, which allows significant miniaturisation of the antenna 10 without disrupting the monopole-like radiation pattern, which is an important requirement for many commercial applications. For example, the dimensions (X×Y×Z) of a conventional higher mode antenna configured to operate in the 2.4 GHz band is approximately 37 mm×30 mm×10 mm, whereas the dimensions of the antenna 10 are approximately 12 mm×12 mm×3.2 mm for the same operating band.

When the antenna 10 is mounted on a PCB or other substrate, the electric field (E-Field) is normal to the PCB/substrate and the antenna is sufficiently small that it is suitable for use in a broad range of applications. Having the E-field oriented in this way means that dominant propagating modes in dynamic and difficult environments are supported. By way of example, the antenna 10 may exhibit a performance improvement of up to 10 dB in comparison with conventional antennas, which can mean the difference between the relevant device of which the antenna is part working or not.

For any given application, the dimensions of the slots 40 may be determined through iterative design in simulation. Changing slot dimensions impacts a number of factors, mainly resonant frequency and bandwidth and so may be tuned according to the specific requirements of the application. For example, creating narrower slots 40 in the rings 42 reduces resonant frequency but also reduces bandwidth.

More generally, the following design considerations are noted. The overall X-Y dimensions of the radiating structure 12 are related to the desired wavelength, and increasing the X-Y dimensions decreases the resonant frequency of the antenna 10. Adding a ring 42 reduces the resonant frequency and bandwidth. Reducing the inter-ring gap width reduces resonant frequency and bandwidth. Reducing slot width reduces resonant frequency and bandwidth. Increasing the height of the radiating structure 12 above the ground plane 14 increases bandwidth. Decreasing the diameter of the shorting connectors 32 reduces resonant frequency and bandwidth. Decreasing the feed connector 30 to shorting connector 32 spacing reduces resonant frequency and bandwidth. Any feature that reduces resonant frequency tends to reduce radiation efficiency to varying extents.

The invention is not limited to the embodiment(s) described herein but can be amended or modified without departing from the scope of the present invention.

The invention claimed is:

1. An antenna comprising:

a radiating structure;

a ground plane; and a feed structure coupled to the radiating structure, wherein the radiating structure comprises a plurality of slots located around an inner portion of the radiating structure, the slots being arranged symmetrically about at least one axis of the radiating structure, the slots being arranged to form a plurality of rings around said inner portion, each ring comprising one or more of said slots;

wherein each ring includes at least one intra-ring gap between adjacent slot ends, and wherein the, or each, slot of any one of said rings is arranged with respect to the, or each, slot of the, or each, adjacent ring such that the respective intra-ring gaps of adjacent rings are not aligned along said at least one axis of the radiating structure.

2. The antenna of claim 1, wherein each of said rings is circular.

3. The antenna of claim 1, wherein said at least one axis comprises two perpendicular axes, the slots being arranged symmetrically about said two perpendicular axes, the slots being arranged such that the, or each, ring is symmetrical about both of said two perpendicular axes.

4. The antenna of claim 1, wherein the, or each, ring comprises at least two slots.

5. The antenna of claim 4, wherein the, or each, ring comprises two slots.

6. The antenna of claim 5, wherein each slot is shaped to form a respective half of the respective ring.

7. The antenna of claim 4, wherein the, or each, ring is circular and each slot is arc-shaped.

8. The antenna of claim 7, wherein each slot is substantially semi-circular.

9. The antenna of claim 1, wherein the arrangement is such that the intra-ring gaps of any two adjacent rings are evenly spaced apart around the centre of the rings.

10. The antenna of claim 9, wherein the, or each, ring comprises two slots, and wherein the slots of any one ring are angularly displaced about the ring centre by 90° with respect to the slots of the, or each, adjacent ring such that the respective intra-ring gaps are angularly spaced apart by 90° about the ring centre.

11. The antenna of claim 1, wherein the slots are arranged to form four concentric rings or to form three concentric rings.

12. The antenna of claim 1, wherein said slots are arranged to create a meandering current path on said radiating structure from said inner portion of said radiating structure to an outer portion of said radiating structure.

13. The antenna of claim 1, wherein the feed structure comprises a feed line and a feed connector connected between the feed line and the inner portion of the radiating structure.

14. The antenna of claim 1, wherein said radiating structure is rectangular, circular, or elliptical in shape.

15. The antenna of claim 1, wherein said at least one axis extends through a centre of said inner portion.

16. The antenna of claim 1, wherein at least one shorting connector is connected between the radiating structure and the ground plane.

17. The antenna of claim 1, wherein said radiating structure, said ground plane and said feed structure are supported by one or more electrically insulating support structure.

18. The antenna of claim 13, wherein said feed connector connects with said radiating structure at a feed point, and wherein at least one axis of symmetry extends through said feed point.

19. The antenna of claim 16, wherein said at least one shorting connector is connected between said inner portion of the radiating structure and said ground plane, and wherein said at least one shorting connector is arranged symmetrically with respect to said at least one axis.

20. The antenna of claim 17, wherein said one or more electrical insulating support structure comprises a single electrically insulating substrate or comprises a first electrically insulating substrate supporting said radiating structure, and a second electrically insulating substrate supporting said ground plane.

* * * * *